United States Patent
Funaki et al.

(10) Patent No.: US 7,884,166 B2
(45) Date of Patent: Feb. 8, 2011

(54) ELASTIC FLUOROCOPOLYMER, ITS COMPOSITION AND CROSSLINKED RUBBER

(75) Inventors: Hiroshi Funaki, Ichihara (JP); Yoshimasa Kai, Ichihara (JP); Hiroki Kamiya, Ichihara (JP); Masayuki Saito, Ichihara (JP); Junpei Nomura, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 1009 days.

(21) Appl. No.: 11/670,660

(22) Filed: Feb. 2, 2007

(65) Prior Publication Data

US 2007/0123672 A1 May 31, 2007

Related U.S. Application Data

(63) Continuation of application No. PCT/JP2005/014215, filed on Aug. 3, 2005.

(30) Foreign Application Priority Data

| Aug. 4, 2004 | (JP) | ............................. 2004-228191 |
| Mar. 25, 2005 | (JP) | ............................. 2005-090143 |
| Jun. 7, 2005 | (JP) | ............................. 2005-167065 |
| Jun. 24, 2005 | (JP) | ............................. 2005-185035 |

(51) Int. Cl.
*C08F 16/24* (2006.01)

(52) U.S. Cl. ........................ 526/247; 526/250; 526/255; 526/326.3

(58) Field of Classification Search .................. 526/247, 526/250, 255, 326.3

See application file for complete search history.

(56) References Cited

U.S. PATENT DOCUMENTS

| 6,703,465 B2 * | 3/2004 | Funaki et al. ................ 526/247 |
| 7,498,402 B2 * | 3/2009 | Nakaya et al. .......... 528/502 R |

FOREIGN PATENT DOCUMENTS

| EP | 1808448 A1 | * | 7/2007 |
| JP | 62-56887 | | 11/1987 |
| JP | 3-33148 | * | 2/1991 |
| JP | 3-106957 | | 5/1991 |
| JP | 4-270748 | | 9/1992 |
| JP | 4-298513 | * | 10/1992 |
| JP | 04-298513 | * | 10/1992 |
| JP | 5-339524 | | 12/1993 |
| JP | 6-306242 | | 11/1994 |
| JP | 7-18581 | | 1/1995 |
| JP | 9-278943 | | 10/1997 |
| JP | 11-116634 | | 4/1999 |
| JP | 2002-194008 | * | 7/2002 |
| JP | 2004-069983 | | 3/2004 |
| JP | 2005-186568 | | 7/2005 |
| JP | 2006-70245 | * | 3/2006 |
| WO | WO-2005/003190 A1 | * | 1/2005 |

OTHER PUBLICATIONS

Masayoshi Tatemoto, Japanese Journal of Polymer Science and Technology, 49(10), 765 to 783 (1992).
U.S. Appl. No. 12/407,025, filed Mar. 19, 2009, Nomura, et al.
U.S. Appl. No. 11/619,356, filed Jan. 3, 2007, Nomura, et al.

* cited by examiner

*Primary Examiner*—Peter D. Mulcahy
*Assistant Examiner*—Henry Hu
(74) *Attorney, Agent, or Firm*—Oblon, Spivak, McClelland, Maier & Neustadt, L.L.P.

(57) ABSTRACT

An elastic fluorocopolymer comprises repeating units (l) based on a fluoromonomer such as tetrafluoroethylene, hexafluoropropylene, vinylidene fluoride or $CF_2$=CF—O—$R^f$ (wherein $R^f$ is a $C_{1-8}$ saturated perfluoroalkyl group or a perfluoro(alkoxyalkyl) group) and repeating units (m) based on the formula $CR^1R^2$=$CR^3COOCH$=$CH_2$ (wherein each of $R^1$ and $R^2$ is a hydrogen atom, a $C_{1-10}$ alkyl group or a $C_{1-10}$ alkoxyalkyl group containing an etheric oxygen atom, and $R^3$ is a hydrogen atom, a fluorine atom or a methyl group) in a molar ratio of (m)/((l)+(n))=0.0001 to 0.1. Further, an elastic fluorocopolymer composition comprises (A) the above elastic fluorocopolymer, (B) an unsaturated multifunctional compound and (C) a bivalent metal oxide and/or hydroxide. The elastic fluorocopolymer and the elastic fluorocopolymer composition are excellent in the crosslinkability and can provide a crosslinked rubber thereof excellent in crosslinked rubber properties.

13 Claims, No Drawings

ELASTIC FLUOROCOPOLYMER, ITS COMPOSITION AND CROSSLINKED RUBBER

TECHNICAL FIELD

The present invention relates to an elastic fluorocopolymer excellent in crosslinkability, an elastic fluorocopolymer composition and a crosslinked rubber excellent in crosslinking physical properties.

BACKGROUND ART

As an elastic fluorocopolymer (hereinafter sometimes referred to as fluororubber), a vinylidene fluoride/hexafluoropropylene copolymer, a tetrafluoroethylene/propylene copolymer, a tetrafluoroethylene/perfluoro(alkyl vinyl ether) copolymer, etc., are known.

These elastic fluorocopolymers are excellent in heat resistance, oil resistance, chemical resistance, etc., and can be employed in a severe environment which general materials cannot resist. However, these elastic fluorocopolymers are poor in the reactivity and are insufficient in the crosslinkability and the adhesion to another material, and heretofore, a method for enhancing the reactivity by introducing a reactive functional group has been proposed (e.g. JP-A-11-116634).

Generally speaking, a rubber material, except for some thermoplastic elastomers, is required to develop suitable physical properties by the crosslinking reaction. Therefore, even in a molecule of an elastic fluorocopolymer, a crosslinkable functional group is introduced. In a vinylidene fluoride/hexafluoropropylene copolymer, as a reactive functional group, an iodine atom (e.g. Masayoshi Tatemoto, Japanese Journal of Polymer Science and Technology, 49(10), 765 to 783 (1992)) or an unsaturated bond (e.g. JP-B-62-56887) has been proposed.

A tetrafluoroethylene/propylene copolymer is superior to the vinylidene fluoride/hexafluoropropylene copolymer in view of chemical resistance, especially amine resistance and high-temperature steam resistance (e.g. JP-A-6-306242). With regard to such a copolymer, a method of copolymerizing a monomer containing a crosslinkable functional group such as $CF_2=CFOCF=CFCF_3$, $CF_2=CFOCF_2CF(CF_3)OCF=CFCF_3$ or $CF_2=CFCF_2CF=CFCF_3$ (e.g. JP-B-62-56887), has been proposed, but the effect thereof was insufficient.

Further, with respect to a tetrafluoroethylene/propylene/vinylidene fluoride copolymer, there has been a problem such that if a polyol crosslinking agent is used, when a vinylidene fluoride/hexafluoropropylene copolymer is mixed or an acidic filler such as silica is used with such a copolymer, a crosslinking inhibition is likely to take place.

Accordingly, it is desired to develop a crosslinkable elastic fluorocopolymer containing no iodine atom, and having crosslinkable functional groups introduced to its molecules, without taking any cumbersome steps. Further, it is desired to develop a composition containing such an elastic fluorocopolymer, which is excellent in the crosslinkability.

DISCLOSURE OF THE INVENTION

Object to be Accomplished by the Invention

The object of the present invention is to provide an elastic fluorocopolymer excellent in crosslinkability, an elastic fluorocopolymer composition excellent in crosslinkability and a crosslinked rubber obtained by crosslinking it, which is excellent in crosslinked rubber properties.

Means to Accomplish the Object

The present invention provides an elastic fluorocopolymer comprising repeating units (l) based on at least one fluoromonomer selected from the group consisting of tetrafluoroethylene, hexafluoropropylene, vinylidene fluoride and a perfluorovinyl ether represented by the formula $CF_2=CF-O-R^f$ (wherein $R^f$ is a $C_{1-8}$ saturated perfluoroalkyl group or a perfluoro(alkoxyalkyl) group), repeating units (m) based on a vinyl ester monomer represented by the formula $CR^1R^2=CR^3COOCH=CH_2$ (wherein each of $R^1$ and $R^2$ which are independent of each other, is a hydrogen atom, a $C_{1-10}$ alkyl group or a $C_{1-10}$ alkoxyalkyl group containing an etheric oxygen atom, and $R^3$ is a hydrogen atom, a fluorine atom or a methyl group), and as the case requires, repeating units (n) based on at least one hydrocarbon monomer selected from the group consisting of ethylene, propylene and a vinyl ether represented by the formula $CH_2=CH-O-R^4$ (wherein $R^4$ is a $C_{1-8}$ saturated alkyl group or an alkoxyalkyl group) in a molar ratio of (m)/((l)+(n))=0.0001 to 0.1.

Further, the present invention provides the above elastic fluorocopolymer, which comprises the repeating units (n) in a molar ratio of (n)/(l)=1/99 to 70/30.

Further, the present invention provides the above elastic fluorocopolymer, wherein $R^2$ and $R^3$ in the vinyl ester monomer are hydrogen atoms.

Further, the present invention provides the above elastic fluorocopolymer, wherein the vinyl ester monomer is vinyl crotonate.

Further, the present invention provides the above elastic fluorocopolymer, wherein the fluoromonomer is tetrafluoroethylene, the hydrocarbon monomer is propylene, (n)/(l)=40/60 to 60/40 (molar ratio), and (m)/((l)+(n))=0.0001 to 0.05 (molar ratio).

Further, the present invention provides a process for producing the above elastic fluorocopolymer, which comprises subjecting the fluoromonomer, the vinyl ester monomer, and as the case requires, the hydrocarbon monomer, to radical copolymerization in the presence of a radical polymerization initiator.

Further, the present invention provides the above process for producing the elastic fluorocopolymer, wherein the radical copolymerization is emulsion polymerization carried out in the presence of an aqueous medium and an emulsifier.

Further, the present invention provides the above process for producing the elastic fluorocopolymer, wherein the radical copolymerization is polymerization carried out in the presence of a chain transfer agent, and the chain transfer agent is an alcohol and/or a hydrocarbon.

Further, the present invention provides an elastic fluorocopolymer composition comprising (A) the above elastic fluorocopolymer, (B) an unsaturated multifunctional compound and (C) at least one member selected from a bivalent metal oxide and a bivalent metal hydroxide.

Further, the present invention provides the above elastic fluorocopolymer composition, which further comprises (D) an organic peroxide.

Further, the present invention provides the above elastic fluorocopolymer composition, which comprises the repeating units (n) in a molar ratio of (n)/(l)=1/99 to 70/30.

Further, the present invention provides the above elastic fluorocopolymer composition, wherein $R^2$ and $R^3$ in the vinyl ester monomer are hydrogen atoms.

Further, the present invention provides the above elastic fluorocopolymer composition, wherein the vinyl ester monomer is vinyl crotonate.

Further, the present invention provides the above elastic fluorocopolymer composition, wherein the fluoromonomer is tetrafluoroethylene, the hydrocarbon monomer is propylene, (n)/(l)=40/60 to 60/40 (molar ratio), and (m)/((l)+(n))= 0.0001 to 0.05 (molar ratio).

Further, the present invention provides a crosslinked rubber obtained by crosslinking the above elastic fluorocopolymer.

Still further, the present invention provides a crosslinked rubber obtained by crosslinking the above elastic fluorocopolymer composition.

EFFECTS OF THE INVENTION

The elastic fluorocopolymer of the present invention is a fluororubber excellent in rubber elasticity and crosslinkability. The elastic fluorocopolymer composition of the present invention is excellent in rubber elasticity and crosslinkability, and can realize a high crosslinking rate. Further, even when various components are mixed therewith, no crosslinking inhibition will take place. Furthermore, a crosslinked rubber obtained by crosslinking the elastic fluorocopolymer or the elastic fluorocopolymer composition of the present invention, is excellent in crosslinked rubber properties, and especially excellent in heat resistance, oil resistance, chemical resistance, heat resistance, weather resistance, etc.

BEST MODE FOR CARRYING OUT THE INVENTION

The elastic fluorocopolymer of the present invention comprises repeating units (l) based on at least one fluoromonomer selected from the group consisting of tetrafluoroethylene, hexafluoropropylene, vinylidene fluoride and a perfluorovinyl ether represented by the formula $CF_2=CF-O-R^f$ (wherein $R^f$ is a $C_{1-8}$ saturated perfluoroalkyl group or a perfluoro(alkoxyalkyl) group).

Hereinafter, tetrafluoroethylene will be referred to as TFE, hexafluoropropylene HFP, vinylidene fluoride VdF, a perfluorovinyl ether represented by the formula $CF_2=CF-O-R^f$ PAVE, perfluoro(methyl vinyl ether) PMVE, and perfluoro (propyl vinyl ether) PPVE.

As a PAVE, PMVE, perfluoro(ethyl vinyl ether), PPVE, perfluoro(ethoxyethyl vinyl ether) or perfluoro(propoxypropyl vinyl ether) may, for example, be mentioned. PAVE is preferably PMVE or PPVE.

The elastic fluorocopolymer may be a copolymer using one fluoromonomer, or may be a copolymer using two or more fluoromonomers in combination, and an elastic fluorocopolymer using one fluoromonomer is preferred. Such an elastic fluorocopolymer using one fluoromonomer is preferably a TFE copolymer.

The elastic fluorocopolymer of the present invention comprises, in addition to the repeating units (l) based on the fluoromonomer, repeating units (m) based on a vinyl ester monomer represented by the formula $CR^1R^2=CR^3COOCH=CH_2$ (wherein each of $R^1$ and $R^2$ which are independent of each other, is a hydrogen atom, a $C_{1-10}$ alkyl group or a $C_{1-10}$ alkoxyalkyl group containing an etheric oxygen atom, and $R^3$ is a hydrogen atom, a fluorine atom or a methyl group).

In the vinyl ester monomer, $R^2$ and $R^3$ are preferably hydrogen atoms. As a specific example, preferred is vinyl crotonate, in which $R^1$ is a methyl group and $R^2$ and $R^3$ are hydrogen atoms, or vinyl methacrylate, in which $R^1$, $R^2$ and $R^3$ are hydrogen atoms, and vinyl crotonate is more preferred. The vinyl ester monomer may be used alone or in combination of two or more of them.

Since the vinyl ester monomer has two carbon-carbon unsaturated double bonds, one carbon-carbon unsaturated double bond is used for copolymerization with a fluoromonomer, and the other remains in the elastic fluorocopolymer, to be subjected to the crosslinking reaction.

In addition to the repeating units (l) and (m), the elastic fluorocopolymer of the present invention preferably contains repeating units (n) based on at least one hydrocarbon monomer selected from the group consisting of ethylene, propylene and a vinyl ether represented by the formula $CH_2=CH-O-R^4$ (wherein $R^4$ is a $C_{1-8}$ saturated alkyl group or an alkoxyalkyl group). As the hydrocarbon monomer, ethylene (hereinafter referred to as E) and propylene (hereinafter referred to as P) are more preferred, and P is most preferred. The hydrocarbon monomer may be used alone or in combination of two or more of them.

In the elastic fluorocopolymer of the present invention, the ratio of the repeating units (n)/(l) is preferably from 1/99 to 70/30 (molar ratio), more preferably from 20/80 to 65/35 (molar ratio) and further preferably from 60/40 to 40/60 (molar ratio) Within this range, the elastic fluorocopolymer will be excellent in physical properties of crosslinked rubber, and will have good heat resistance, chemical resistance and low-temperature properties.

The content of the repeating units (m) based on the vinyl ester monomer is preferably such that (m)/((l)+(n))=0.0001 to 0.1 (molar ratio), more preferably (m)/((l)+(n))=0.0001 to 0.05 (molar ratio), furthermore preferably (m)/((l)+(n))= 0.0005 to 0.01 (molar ratio) and particularly preferably (m)/ ((l)+(n))=0.001 to 0.008 (molar ratio). Within the above range, the elastic fluorocopolymer will be excellent in the crosslinkability, and the crosslinked rubber to be obtained will be excellent in crosslinked rubber properties such as tensile strength, chemical resistance, heat resistance and compression set.

As a specific example of the elastic fluorocopolymer of the present invention, a TFE/P copolymer, a TFE/P/VdF copolymer, a VdF/HFP copolymer, a TFE/VdF/HFP copolymer, a TFE/PAVE copolymer, a TFE/PMVE copolymer, a TFE/ PPVE copolymer, a TFE/PMVE/PPVE copolymer, a VdF/ PAVE copolymer, an E/PAVE copolymer or an E/HFP copolymer may be mentioned.

The TFE/P copolymer, the TFE/P/VdF copolymer, the VdF/HFP copolymer, the TFE/VdF/HFP copolymer, the TFE/PPVE copolymer, the TFE/PMVE/PPVE copolymer, etc., are preferred.

The elastic fluorocopolymer preferably has the following copolymer composition. When the copolymer composition is within the following range, a crosslinked rubber will be excellent in crosslinked rubber properties, and will have good heat resistance, chemical resistance, low-temperature properties and rubber elasticity.

In the TFE/P copolymer, repeating units based on TFE/ repeating units based on P=40/60 to 60/40 (molar ratio); in the TFE/P/VdF copolymer, repeating units based on TFE/repeating units based on P/repeating units based on VdF=40 to 60/60 to 40/1 to 10 (molar ratio); in the VdF/HFP copolymer, repeating units based on VdF/repeating units based on HFP=20/80 to 95/5 (molar ratio); in the TFE/VdF/HFP copolymer, repeating units based on TFE/repeating units based on VdF/repeating units based on HFP=20 to 40/20 to 40/20 to 40 (molar ratio); in the TFE/PAVE copolymer, repeating units based on TFE/repeating units based on PAVE=40/60 to 70/30 (molar ratio); in the TFE/PMVE copolymer, repeating units based on TFE/repeating units based on PMVE=40/60 to 70/30 (molar ratio); in the TFE/PPVE copolymer, repeating units based on TFE/repeating units based on PPVE=40/60 to 70/30 (molar ratio); in the TFE/PMVE/PPVE copolymer, repeating units based on TFE/repeating units based on PMVE/repeating units based on PPVE=40 to 70/3 to 57/3 to 57 (molar ratio); in the VdF/PAVE copolymer, repeating units based on VdF/repeating units based on PAVE=60/40 to 95/5 (molar ratio); in the E/PAVE copolymer, repeating units based on E/repeating units based on PAVE=40/60 to 60/40 (molar ratio); and in the E/HFP copolymer, repeating units based on E/repeating-units based on HFP=40/60 to 60/40 (molar ratio).

The Mooney viscosity of the elastic fluorocopolymer is preferably from 20 to 150, more preferably from 30 to 150. The Mooney viscosity is an indication of the molecular weight. A higher Mooney viscosity indicates a higher molecular weight, and a lower Mooney viscosity indicates a lower molecular weight. When the viscosity is within this range, the processability of the elastic fluorocopolymer and crosslinked rubber properties will be good. The Mooney viscosity is a value measured in accordance with JIS K6300, by using a large rotor having a diameter of 38.1 mm and a thickness of 5.54 mm, at 100° C. for a preheating time of 1 minute for a rotating time of 4 minutes.

As a process for producing the elastic fluorocopolymer of the present invention, emulsion polymerization, solution polymerization, suspension polymerization or bulk polymerization may, for example, be mentioned. Further, for the initiation reaction, a radial polymerization initiator, a redox polymerization initiator, heat or radiation may, for example, be used. Emulsion polymerization is preferred in view of excellent controllability of the molecular weight and the copolymer composition, and productivity.

As a process for producing the elastic fluorocopolymer of the present invention, the fluoromonomer, the vinyl ester monomer and as the case requires, the hydrocarbon monomer are subjected to radical copolymerization in the presence of a radical polymerization initiator. Further, the radical copolymerization is preferably carried out in the presence of a chain transfer agent. Furthermore, the radical polymerization is more preferably an emulsion polymerization carried out in the presence of an aqueous medium or an emulsifier.

As the aqueous medium, water or water containing a water-soluble organic solvent is preferred. As the water-soluble organic solvent, tert-butanol, propylene glycol, dipropylene glycol, dipropylene glycol monomethyl ether or tripropylene glycol may, for example, be mentioned. tert-Butanol, propylene glycol and dipropylene glycol monomethyl ether are preferred. In a case where the aqueous medium contains a water-soluble organic solvent, its content is preferably from 1 to 50 parts by mass, more preferably from 3 to 20 parts by mass, per 100 parts by mass of water.

As the emulsifier, an ionic emulsifier with which mechanical and chemical stabilities of the latex are achieved is preferred, and an anionic emulsifier is more preferred. As the anionic emulsifier, a hydrocarbon emulsifier such as sodium lauryl sulfate or sodium dodecylbenzene sulfonate, a fluoroalkyl carboxylate such as ammonium perfluorooctanoate or ammonium perfluorohexanoate, a fluorine-containing emulsifier represented by the formula $F(CH_2)_nO(CF(X)CF_2O)_mCF(X)COOA$ (wherein X is a fluorine atom or a $C_{1-3}$ perfluoroalkyl group, A is a hydrogen atom, an alkali metal or $NH_4$, n is an integer of from 2 to 10, and m is 0 or an integer of from 1 to 3), etc., are preferred.

As the fluorine-containing emulsifier represented by $F(CF_2)_nO(CF(X)CF_2O)CF(X)COOA$, $F(CF_2)_3O(CF(CF_3)CF_2O)_2CF(CF_3)COONH_4$, $F(CF_2)_3OCF_2CF_2OCF_2COONH_4$, $F(CF_2)_2O(CF_2CF_2O)_2CF_2COONH_4$, $F(CF_2)_2OCF_2CF_2OCF_2COONH_4$, $F(CF_2)_3O(CF_2CF_2O)_2CF_2COONH_4$, $F(CF_2)_4OCF_2CF_2OCF_2COONH_4$, $F(CF_2)_4O(CF_2CF_2O)_2CF_2COONH_4$, $F(CF_2)_2OCF_2CF_2OCF_2COONa$, $F(CF_2)_2O(CF_2CF_2O)_2CF_2COONa$, $F(CF_2)_3OCF_2CF_2OCF_2COONa$, $F(CF_2)_3O(CF_2CF_2O)_2CF_2COONa$, $F(CF_2)_4OCF_2CF_2OCF_2COONa$ or $F(CF_2)_4O(CF_2CF_2O)_2CF_2COONa$ may, for example, be mentioned.

As the emulsifier, ammonium perfluorooctanoate, $F(CF_2)_4OCF_2CF_2OCF_2COONH_4$, $F(CF_2)_3OCF_2CF_2OCF_2COONH_4$ and $F(CF_2)_2OCF_2CF_2OCF_2COONH_4$ are more preferred.

The content of the emulsifier is preferably from 0.01 to 15 parts by mass, more preferably from 0.1 to 10 parts by mass, per 100 parts by mass of the aqueous medium.

As the radical polymerization initiator to be used in the emulsion polymerization, a water-soluble initiator is preferred, and as a specific example thereof, a persulfate such as ammonium persulfate, hydrogen peroxide, an organic initiator such as disuccinic peroxide or azobisisobutylamidine dihydrochloride, a redox initiator comprising a combination of a persulfate or hydrogen peroxide with a reducing agent such as sodium hydroxymethanesulfinate, sodium hydrogen sulfite or sodium thiosulfate, or an inorganic initiator having a small amount of iron, ferrous salt, silver sulfate or the like incorporated in the redox polymerization initiator may be mentioned. Preferred is an ammonium persulfate/sodium hydroxymethanesulfinate/ferrous sulfate type, and it is more preferred to add disodium ethylenediaminetetraacetate thereto as a chelating agent. The content of the polymerization initiator is preferably from 0.0001 to 3 mass %, more preferably from 0.001 to 1 mass %, based on the monomers to be used for the copolymerization.

Further, in a case where the redox initiator is used, it is preferred to use a pH buffering agent in combination. As the pH buffering agent, an inorganic salt such as disodium hydrogenphosphate, sodium dihydrogenphosphate or sodium carbonate may be used, and disodium hydrogenphosphate dihydrate or disodium hydrogenphosphate dodecahydrate may, for example, be mentioned.

In order to adjust the molecular weight of the elastic fluorocopolymer of the present invention, it is preferred to use a chain transfer agent at the time of polymerization. As the chain transfer agent, an alcohol, a hydrocarbon, a mercaptan, a chlorofluorohydrocarbon, $R^{f2}I_2$ (wherein $R^{f2}$ is a $C_{1-16}$ saturated polyfluoroalkylene group) or $R^{f3}IBr$ (wherein $R^{f3}$ is a $C_{1-16}$ saturated polyfluoroalkylene group) may, for example, be used.

As the alcohol, a primary alcohol such as methanol or ethanol, or a secondary alcohol such as 1-methylpropanol (sometimes referred to as 2-butanol), 1-methylbutanol (sometimes referred to as 2-pentanol), 1-methylpentanol (sometimes referred to as 2-hexanol), 1-methylhexanol (sometimes referred to as 2-heptanol), 1-methylheptanol (sometimes referred to as 2-octanol), 1-ethylhexanol (sometimes referred to as 3-octanol) or 1-propylpentanol (sometimes referred to as 4-octanol) may be mentioned.

As the hydrocarbon, methane, ethane, propane, butane, pentane, hexane or cyclohexane may, for example, be mentioned.

As the mercaptan, tert-dodecylmercaptan, n-dodecylmercaptan or n-octadecylmercaptan may, for example, be mentioned.

As the chlorofluorohydrocarbon, 1,3-dichloro-1,1,2,2,3-pentafluoropropane or 1,1-dichloro-1-fluoroethane may, for example, be mentioned.

As the $R^{f2}I_2$, 1,4-diiodoperfluorobutane may, for example, be mentioned. Further, as $R^{f3}IBr$, 1-bromo-4-iodoperfluorobutane may, for example, be mentioned.

As the chain transfer agent, an alcohol or a hydrocarbon is preferred, and at least one member selected from the group consisting of 1-methylpropanol, 1-methylheptanol and propane, is more preferred.

The polymerization conditions such as the polymerization pressure and the temperature may optionally be selected depending on the monomer composition, the decomposition temperature of the radical polymerization initiator, etc. Usually, the polymerization pressure is preferably from 0.1 to 20 MPaG, more preferably from 0.3 to 10 MPaG, and most preferably from 0.3 to 5 MPaG. The polymerization temperature is preferably from 0 to 100° C., more preferably from 10 to 90° C. and most preferably from 20 to 80° C.

An elastic fluorocopolymer latex to be obtained by the above emulsion polymerization is coagulated by a known method to isolate an elastic fluorocopolymer. For the coagulation, a method of adding a metal salt, a method of adding an inorganic acid such as hydrochloric acid, a method of mechanical sheering or a method of freeze-thawing may, for example, be employed.

The crosslinked rubber of the present invention is made by crosslinking the elastic fluorocopolymer. The crosslinked rubber of the present invention is obtained by molding the elastic fluorocopolymer itself without mixing a filler or the like, followed by crosslinking it by means of irradiation, etc. Also, it is obtained by heat-crosslinking an elastic fluorocopolymer composition obtained by mixing only a crosslinking agent such as an organic peroxide with the elastic fluorocopolymer. The content of the organic peroxide is preferably from 0.3 to 10 parts by mass, more preferably from 0.3 to 5 parts by mass, most preferably from 0.5 to 3 parts by mass, per 100 parts by mass of the elastic fluorocopolymer. When the content is within this range, a crosslinked rubber excellent in balance of tensile strength and elongation will be obtained. A crosslinked rubber containing no filler has a low content of impurities such as trace metal, whereby it is useful for applications such as parts used in a process for producing semiconductor devices or electronics parts.

With respect to the crosslinked rubber of the present invention, the elastic fluorocopolymer is usually mixed with a crosslinking agent, a filler, a crosslinking aid or the like to prepare a composition, which is molded and subjected to heat-crosslinking. As the crosslinking agent, an organic peroxide, a polyol, an amine compound or the like is used, and particularly, an organic peroxide with which a crosslinked rubber excellent in productivity, heat resistance and chemical resistance will be obtained, is preferred.

The elastic fluorocopolymer composition of the present invention comprises (A) an elastic fluorocopolymer, (B) an unsaturated multifunctional compound and (C) at least one member selected from a bivalent metal oxide and a bivalent metal hydroxide.

As (A) component in the elastic fluorocopolymer composition of the present invention, the above elastic fluorocopolymer is used.

As a specific example of the unsaturated multifunctional compound as (B) component in the elastic fluorocopolymer composition of the present invention, triallyl cyanurate, triallyl isocyanurate, triallyl isocyanurate oligomer, trimethallyl isocyanurate, 1,3,5-triacryloylhexahydro-1,3,5-triazine, triallyl trimellitate, m-phenylenediaminebismaleimide, p-quinone dioxime, p,p'-dibenzoylquinone dioxime, dipropargyl terephthalate, diallyl phthalate, N,N'N'',N'''-tetraallyl terephthalamide, or a vinyl group-containing siloxane oligomer such as polymethylvinylsiloxane or polymethylphenylvinylsiloxane may be mentioned.

Among them, triallyl cyanurate, triallyl isocyanurate and trimethallyl isocyanurate are particularly preferred, and triallyl isocyanurate is more preferred.

The unsaturated multifunctional compound as (B) component may be used alone or in combination of two or more of them. By the unsaturated multifunctional compound as (B) component, the crosslinking efficiency of the elastic fluorocopolymer composition at the time of crosslinking can be improved.

The content of the unsaturated multifunctional compound as (B) component is preferably from 0.1 to 10 parts by mass, more preferably from 0.5 to 7 parts by mass, per 100 parts by mass of the elastic fluorocopolymer. When the content is within this range, excellent crosslinked rubber properties well balanced in strength and elongation will be obtained.

The elastic fluorocopolymer composition of the present invention contains, as (C) component, at least one member selected from a bivalent metal oxide and a bivalent metal hydroxide, whereby at the time of crosslinking the elastic fluorocopolymer, crosslinking rate is remarkably high, whereby it is possible to obtain a crosslinked product that exhibits excellent physical properties. As a specific example of the bivalent metal oxide, a bivalent metal oxide such as magnesium oxide, calcium oxide, zinc oxide or lead oxide is preferred. As a specific example of the bivalent metal hydroxide, calcium hydroxide or magnesium hydroxide may be mentioned. The bivalent metal oxide and the bivalent metal hydroxide may be used alone or in combination of both of them. Further, the bivalent metal oxide may be used alone or in combination of two or more of them. Further, the bivalent metal hydroxide may be used alone or in combination of two or more of them. The content of (C) component is preferably from 0.1 to 10 parts by mass, more preferably from 0.5 to 5 parts by mass, per 100 parts by mass of the elastic fluorocopolymer. When the content is within this range, excellent crosslinked rubber properties well balanced in strength and elongation will be obtained.

In the elastic fluorocopolymer composition of the present invention, a crosslinking agent may be contained.

As the crosslinking agent, an organic peroxide, a polyol, an amine compound or the like may be used, and particularly, an organic peroxide with which a crosslinked rubber excellent in productivity, heat resistance and chemical resistance will be obtained, is preferred.

The organic peroxide as (D) component used in the present invention is an organic peroxide having a —O—O— bond, and as a specific example thereof, a dialkyl peroxide such as di-tert-butyl peroxide, tert-butyl cumyl peroxide, dicumyl peroxide, α,α'-bis(tert-butylperoxy)-diisopropylbenzene, 2,5-dimethyl-2,5-di(tert-butylperoxy)hexane or 2,5-dimethyl-2,5-di(tert-butylperoxy)hexane-3, 1,1-di(tert-butylperoxy)-3,3,5-trimethylcyclohexane, 2,5-dimethylhexane-2,5-dihydroxy peroxide, benzoyl peroxide, tert-butylperoxybenzene, 2,5-dimethyl-2,5-di(benzoylperoxy)hexane, tert-butylperoxymaleate or tert-butylperoxyisopropyl carbonate may be mentioned. Among them, a dialkyl peroxide is preferred.

The content of the organic peroxide is preferably from 0.3 to 10 parts by mass, more preferably from 0.3 to 5 parts by mass, most preferably from 0.5 to 3 parts by mass, per 100 parts by mass of the elastic fluorocopolymer. When the content is within this range, a crosslinked rubber excellent in balance of tensile strength and elongation will be obtained.

In the elastic fluorocopolymer composition of the present invention, a reinforcing agent, a filler, an additive, etc., may optionally be incorporated. As the reinforcing agent or the filler, a rubber reinforcing material or a filler, which is usually used at the time of producing a conventional crosslinked rubber may, for example, be mentioned. For example, an inorganic reinforcing material such as carbon black such as channel black, furnace black, acetylene black or thermal black, white carbon, magnesium carbonate or calcium carbonate on which the surface is treated, an inorganic filler such as calcium carbonate, clay, talc, silica, diatomaceous earth, alumina or barium sulfate, or another filler may be mentioned. As the additive, a pigment, an anti-oxidant, a stabilizer, a processing aid or an internal mold release agent may, for example, be mentioned. Each of the reinforcing agent, filler and additive may be used is alone or in combination of two or more of them. The amount of the reinforcing agent to be mixed may suitably be selected, but it is preferably from 1 to 100 parts by mass per 100 parts by mass of the elastic fluorocopolymer. The amount of the filler to be mixed may suitably be selected, but it is preferably from 1 to 100 parts by mass per 100 parts by mass of the elastic fluorocopolymer.

Further, in the elastic fluorocopolymer composition of the present invention, at least one member selected from another fluororubber, EPDM (ethylene propylene rubber), a silicone rubber, an acrylic rubber, another rubber, a fluororesin and the like, may be incorporated.

At the time of producing the elastic fluorocopolymer composition of the present invention, it is desirable to adequately and uniformly mix the elastic fluorocopolymer, the unsaturated multifunctional compound, the bivalent metal oxide and/or hydroxide, and as the case requires, an organic peroxide, a fluororubber, another reinforcing agent, a filler, an additive, etc. This mixing is carried out by means of a kneading roll for rubbers, a kneader, a Banbury mixer or the like, which has been commonly employed. The processing conditions for the mixing are not particularly limited. However, it is possible that the added components are sufficiently dispersed and mixed in the elastic fluorocopolymer usually by kneading at a temperature of from about 30 to 80° C. for from about 10 to 60 minutes. Further, it is possible that the added components are dissolved and dispersed in a suitable solvent to prepare a suspension solution. Furthermore, so-called wet mixing may be adopted, whereby the mixing is carried out in a medium from the very beginning. In such a case, a composition in the form of a solution can be obtained by means of a mixing machine such as a roll, ball mill or homogenizer. Further, with respect to the processing conditions and operations at the time of mixing, it is desirable to select the optimum conditions depending upon the starting materials and the types of the components to be mixed or the purpose.

The elastic fluorocopolymer composition of the present invention may be molded into a molded product such as a seal, a packing, a sheet, a pipe, a rod, a tube, an angle, a channel, a coated cloth or a coated plate, by a molding method such as extrusion, transfer, calender, roll coating, brush coating, impregnation or the like, in addition to a usual mold molding, and may be molded into unusual shapes or special shapes, such as spongy rubber, etc., by other various molding methods. The elastic fluorocopolymer composition of the present invention thus molded may be crosslinked by crosslinking means as described hereinafter.

In the present invention, the crosslinking is preferably carried out by heat, radiation, etc. As the radiation to be emitted, an electron ray or an ultraviolet ray may, for example, be mentioned.

For the operation at the time of crosslinking, an operation which has been commonly employed, may be adopted.

As heat-crosslinking, it is possible to employ an operation of heating the composition while pressurizing it in a mold, or an operation of molding the composition by e.g. extrusion or a calender roll, followed by heating in a heating oven or a steam vessel. With respect to the processing conditions at the time of crosslinking, it is desirable to select optimum conditions depending upon the starting materials and the components to be mixed.

The temperature at the time of crosslinking is usually from about 60 to 250° C., preferably from about 120 to 200° C. Further, the heating time is not particularly limited, but in a case where an organic peroxide is mixed, it is set within a range of from 1 minute to 3 hours, preferably within a range of from 5 minutes to 2 hours, depending on a type of the organic peroxide. A higher heating temperature can shorten the heating time. Further, it is possible to adopt a reheating treatment of a crosslinked product to be obtained, which is useful for improving the physical properties. For example, a reheating treatment at a temperature of from 150 to 250° C., preferably from 180° C. to 230° C. for about 2 to 25 hours may be adopted.

In a case of the heat-crosslinking when an organic peroxide is mixed, a composition prepared by incorporating an unsaturated multifunctional compound, at least one member selected from a bivalent metal oxide and a bivalent metal hydroxide, and an organic peroxide, in an elastic fluorocopolymer, is heated. It is considered that by this heating, organic peroxide crosslinking proceeds by unsaturated bonds in the elastic fluorocopolymer and an unsaturated bond in the unsaturated multifunctional compound. Here, it is estimated that the activity of the elastic fluorocopolymer to the crosslinking reaction is further enhanced by incorporating at least one member selected from a bivalent metal oxide and a bivalent metal hydroxide, whereby the organic peroxide crosslinking proceeds effectively, and the obtained crosslinked product will have good heat resistance, oil resistance and chemical resistance.

As a preferred specific example of radiation crosslinking, a method wherein a suspension solution having the elastic fluorocopolymer composition of the present invention dissolved and dispersed in an suitable solvent, is formed by coating or the like, dried and irradiated with radiation, or a method wherein the elastic fluorocopolymer composition of the present invention is subjected to extrusion, followed by irradiation with radiation, may be mentioned.

The conditions for coating in the irradiation crosslinking are not particularly limited, but the coating is carried out usually at room temperature, and the drying temperature is not particularly limited but is preferably from 40 to 100° C. The temperature condition for the molding in the irradiation crosslinking may optionally be selected depending on the molding methods. The condition for extrusion in the irradiation crosslinking is not particularly limited, but it is preferably from 50° C. to 250° C., more preferably from 70° C. to 230° C.

The irradiation amount in the electron ray irradiation may optionally be selected, but it is preferably from 0.1 to 30 Mrad, more preferably from 1 to 20 Mrad.

In the irradiation crosslinking, it is considered that by irradiating a composition comprising an elastic fluorocopolymer, and an unsaturated multifunctional compound and at least one member selected from a bivalent metal oxide and a bivalent metal hydroxide incorporated, the crosslinking proceeds by unsaturated bonds in the elastic fluorocopolymer and an unsaturated bond in the unsaturated multifunctional compound. Here, it is estimated that the activity of the elastic fluorocopolymer to the crosslinking reaction is further enhanced by incorporating at least one member selected from a bivalent metal oxide and a bivalent metal hydroxide, whereby the crosslinking proceeds effectively, and the obtained crosslinked product will have good heat resistance, oil resistance and chemical resistance.

EXAMPLES

Now, the present invention will be described in further detail with reference to Examples. However, the present invention is by no means restricted thereto. Further, the respective measurements of the copolymer composition of the elastic fluorocopolymer, the Mooney viscosity and the physical properties of the crosslinked rubber were conducted by the following methods.

(Copolymer Composition of Elastic Fluorocopolymer)

An elastic fluorocopolymer was dissolved in deuterated tetrahydrofuran and $^{13}$C-NMR was measured to analyze the copolymer composition.

(Mooney Viscosity)

The Mooney viscosity is a value measured in accordance with JIS K6300 by using a large rotor having a diameter of 38.1 mm and a thickness of 5.54 mm, at 100° C. for a preheating time of 1 minute for a rotating time of 4 minutes. The larger the value the higher the molecular weight indirectly indicated.

(Physical Properties of Crosslinked Rubber)

To 100 parts by mass of an elastic fluorocopolymer, 25 parts by mass of carbon black, 3 parts by mass of triallyl isocyanurate and 1 part by mass of 1,3-bis(tert-butylperoxyisopropyl)benzene (Perkadox 14, manufactured by NOF CORPORATION) were kneaded by means of twin rollers to obtain an elastic fluorocopolymer composition. Then, primary crosslinking was carried out by heat-press at 170° C. for 20 minutes, and then secondary crosslinking was carried out in an oven at 200° C. for 4 hours. The tensile strength and the elongation at break (hereinafter simply referred to as "elongation") of the obtained crosslinked rubber were measured in accordance with JIS K6251. Further, the hardness was measured in accordance with JIS K6253.

Example 1

TFE/P/Vinyl Crotonate Copolymer

After deaerating a pressure-resistant reactor made of stainless steel having an internal volume of 3,200 mL, equipped with a stirring anchor blade, 1,600 g of de-ionized water, 40 g of disodium hydrogenphosphate dodecahydrate, 0.5 g of sodium hydroxide, 97 g of tert-butanol, 9 g of sodium lauryl sulfate and 2.5 g of ammonium persulfate were charged. Further, an aqueous solution having 0.4 g of disodium ethylenediaminetetraacetate dihydrate (hereinafter referred to as EDTA) and 0.3 g of ferrous sulfate heptahydrate preliminarily dissolved in 200 g of deionized water, was introduced. Then, at 40° C., a mixed monomer gas of TFE/P=85/15 (molar ratio) was fed so as to bring the internal pressure of the reactor to be 2.50 MPaG. The anchor blade was stirred at 300 rpm, and a 2.5 mass % sodium hydroxymethanesulfinate dihydrate (hereinafter sometimes referred to as Rongalit) aqueous solution (hereinafter referred to as 2.5 mass % Rongalit aqueous solution), of which pH was adjusted to 10.0 by sodium hydroxide, was added to initiate the polymerization reaction. Thereafter, the 2.5 mass % Rongalit aqueous solution was continuously added by using a high-pressure pump.

As the polymerization proceeded, the pressure decreased. Accordingly, when the internal pressure of the reactor decreased to 2.49 MPaG, a mixed gas of TFE/P=56/44 (molar ratio) was fed by its own pressure to increase the internal pressure of the reactor to 2.51 MPaG. The polymerization reaction was continued by repeating this operation to maintain the internal pressure of the reactor to from 2.49 to 2.51 MPaG. When the amount of the TFE/P mixed gas added reached 50 g, 4 mL of a vinyl crotonate/tert-butanol=5/95 (mass ratio) solution preliminarily prepared was fed into the reactor by nitrogen backpressure. Thereafter, until the amount of the TFE/P mixed gas added reached 330 g, every time when 20 g of the TFE/P mixed gas was added, 4 mL of the tert-butanol solution of vinyl crotonate was added, and 60 mL was fed in total. When the total amount of the TFE/P mixed gas added reached 400 g, the addition of the 2.5 mass % Rongalit aqueous solution was stopped, and the internal temperature of the reactor was lowered to 10° C. to terminate the polymerization reaction to obtain a TFE/P/vinyl crotonate copolymer latex. The amount of the 2.5 mass % Rongalit aqueous solution used was 23 g. The polymerization time was about 3.5 hours.

Then, the latex was added to a 5 mass % calcium chloride aqueous solution to coagulate the latex by salting-out to precipitate a TFE/P/vinyl crotonate copolymer. The copolymer thus precipitated was collected by filtration, washed with deionized water, and dried in an oven at 120° C. for 12 hours to obtain 398 g of a white TFE/P/vinyl crotonate copolymer.

In the infrared spectrum of the copolymer, an absorption based on a carbon-carbon double bond in the vicinity of 1,700 $cm^{-1}$ was confirmed. The composition of the copolymer was such that repeating units based on TFE/repeating units based on P/repeating units based on vinyl crotonate=55.3/44.7/0.17 (molar ratio). The Mooney viscosity was 135. Crosslinked rubber properties of the TFE/P/vinyl crotonate copolymer are shown in Table 1.

Example 2

TFE/P/Vinyl Methacrylate Copolymer

A TFE/P/vinyl methacrylate copolymer latex was obtained in the same manner as in Example 1 except that vinyl methacrylate was used instead of vinyl crotonate. The amount of the 2.5 mass % Rongalit aqueous solution used was 17 g. The polymerization time was about 3 hours.

In the same manner as in Example 1, the latex was subjected to salting-out, and then the precipitated copolymer was washed and dried to obtain 398 g of a white TFE/P/vinyl methacrylate copolymer. In the infrared spectrum of the copolymer, an absorption based on a carbon-carbon double bond in the vicinity of 1,700 $cm^{-1}$ was confirmed. The composition of the copolymer was such that repeating units based on TFE/repeating units based on P/repeating units based on vinyl methacrylate=53.6/46.4/0.13 (molar ratio). The Mooney viscosity was 145. Crosslinked rubber properties of the TFE/P/vinyl methacrylate copolymer are shown in Table 1.

Comparative Example 1

TFE/P Copolymer

A TFE/P copolymer latex was obtained in the same manner as in Example 1 except that vinyl crotonate was not used. The amount of the 2.5 mass % Rongalit aqueous solution used was 28.5 g. The polymerization time was about 2.8 hours.

In the same manner as in Example 1, the latex was subjected to salting-out, and then the precipitated copolymer was washed and dried to obtain 398 g of a white TFE/P copolymer. The composition of the copolymer was such that repeating units based on TFE/repeating units based on P=55.8/44.2 (molar ratio) The Mooney viscosity was 130. In the infrared spectrum of the TFE/P copolymer, no absorption based on a carbon-carbon double bond was confirmed. Crosslinked rubber properties of the TFE/P copolymer are shown in Table 1.

Example 3

TFE/P/vinyl Crotonate Copolymer Which Used 1-Methylpropanol as Chain Transfer Agent After deaerating a pressure-resistant reactor made of stainless steel having an internal volume of 3,200 mL, equipped with a stirring anchor blade, 1,590 g of deionized water, 57 g of disodium hydrogenphosphate dodecahydrate, 1 g of sodium hydroxide, 97 g of tert-butanol, 9 g of sodium lauryl sulfate, 4.2 g of ammonium persulfate and 9 g of 1-methylpropanol were charged. Further, an aqueous solution having 0.4 g of EDTA and 0.3 g of ferrous sulfate heptahydrate preliminarily dissolved in 200 g of deionized water, was introduced. Then, at 40° C., a mixed monomer gas of TFE/P=88/12 (molar ratio) was fed so as to bring the internal pressure of the reactor to be 2.50 MPaG. The anchor blade was stirred at 300 rpm, and a 4.6 mass % Rongalit aqueous solution, of which pH was adjusted to 10.0 by sodium hydroxide, was added to initiate the polymerization reaction. Thereafter, the 4.6 mass % Rongalit aqueous solution was continuously added by using a high-pressure pump.

As the polymerization proceeded, the pressure decreased. Accordingly, when the internal pressure of the reactor decreased to 2.49 MPaG, a mixed gas of TFE/P=56/44 (molar ratio) was fed by its own pressure to increase the internal pressure of the reactor to 2.51 MPaG. The polymerization reaction was continued by repeating this operation to maintain the internal pressure of the reactor to from 2.49 to 2.51 MPaG. When the amount of the TFE/P mixed gas added reached 10 g, 1 mL of a vinyl crotonate/tert-butanol=4/96 (mass ratio) solution preliminarily prepared was fed into the reactor by nitrogen backpressure. Thereafter, until the amount of the TFE/P mixed gas added reached 390 g, every time when 10 g of the TFE/P mixed gas was added, 1 mL of the vinyl crotonate/tert-butanol solution was added, and 39 mL was fed in total. When the total amount of the TFE/P mixed gas added reached 400 g, the addition of the 4.6 mass % Rongalit aqueous solution was stopped, and the internal temperature of the reactor was lowered to 10° C. to terminate the polymerization reaction to obtain a TFE/P/vinyl crotonate copolymer latex. The amount of the 4.6 mass % Rongalit aqueous solution used was 26 g. The polymerization time was about 4 hours.

In the same manner as in Example 1, the latex was subjected to salting-out, and then the precipitated copolymer was washed and dried to obtain 390 g of a white TFE/P/vinyl crotonate copolymer.

In the infrared spectrum of the copolymer, an absorption based on a carbon-carbon double bond in the vicinity of 1,700 $cm^{-1}$ was confirmed. The composition of the copolymer was such that repeating units based on TFE/repeating units based on P/repeating units based on vinyl crotonate=54.7/45.3/0.20 (molar ratio). The Mooney viscosity was 82. Crosslinked rubber properties of the TFE/P/vinyl crotonate copolymer are shown in Table 1.

Example 4

TFE/P/Vinyl Crotonate Copolymer Which used 1-Methylheptanol as Chain Transfer Agent A TFE/P vinyl crotonate copolymer latex was obtained in the same manner as in Example 3 except that 5.4 g of 1-methylheptanol was used instead of using 9 g of 1-methylpropanol. The amount of the 4.6 mass % Rongalit aqueous solution used was 24 g. The polymerization time was about 3.5 hours.

In the same manner as in Example 1, the latex was subjected to salting-out, and then the precipitated copolymer was washed and dried to obtain 390 g of a white TFE/P/vinyl crotonate copolymer.

In the infrared spectrum of the copolymer, an absorption based on a carbon-carbon double bond in the vicinity of 1,700 $cm^{-1}$ was confirmed. The composition of the copolymer was such that repeating units based on TFE/repeating units based on P/repeating units based on vinyl crotonate=55.5/44.5/0.19 (molar ratio). The Mooney viscosity was 70. Crosslinked rubber properties of the TFE/P/vinyl crotonate copolymer are shown in Table 1.

Example 5

TFE/P/Vinyl Crotonate Copolymer Which Used Propane as Chain Transfer Agent

After deaerating a pressure-resistant reactor made of stainless steel having an internal volume of 3,200 mL, equipped with a stirring anchor blade, 1,600 g of deionized water, 40 g of disodium hydrogenphosphate dodecahydrate, 0.5 g of sodium hydroxide, 97 g of tert-butanol, 9 g of sodium lauryl sulfate and 2.5 g of ammonium persulfate were charged. Further, an aqueous solution having 0.4 g of EDTA and 0.3 g of ferrous sulfate heptahydrate preliminarily dissolved in 200 g of deionized water, was introduced. Then, at 40° C., a mixed monomer gas of TFE/P/propane=85/12/3 (molar ratio) was fed so as to bring the internal pressure of the reactor to be 2.60 MPaG. The anchor blade was stirred at 300 rpm, and a 4.6 mass % Rongalit aqueous solution was added to initiate the polymerization reaction. Thereafter, the 4.6 mass % Rongalit aqueous solution was continuously added by using a high-pressure pump.

As the polymerization proceeded, the pressure decreased. Accordingly, when the internal pressure of the reactor decreased to 2.59 MPaG, a mixed gas of TFE/P/propane=51/40/9 (molar ratio) was fed by its own pressure to increase the internal pressure of the reactor to 2.61 MPaG. The polymerization reaction was continued by repeating this operation to maintain the internal pressure of the reactor to from 2.59 to 2.61 MPaG. When the amount of the TFE/P/propane mixed gas added reached 10 g, 1 mL of a vinyl crotonate/tert-butanol=3.9/96.1 (mass ratio) solution preliminarily prepared was fed into the reactor by nitrogen backpressure. Thereafter, until the amount of the TFE/P/propane mixed gas added reached 390 g, every time when 10 g of the TFE/P/propane mixed gas was added, 1 mL of the tert-butanol solution of vinyl crotonate was added, and 39 mL was fed in total. When the total amount of the TFE/P/propane mixed gas added reached 400 g, the addition of the 4.6 mass % Rongalit aqueous solution was stopped, and the internal temperature of the reactor was lowered to 10° C. to terminate the polymerization reaction to obtain a TFE/P/vinyl crotonate copolymer latex. The amount of the 4.6 mass % Rongalit aqueous solution used was 26 g. The polymerization time was about 4 hours.

In the same manner as in Example 1, the latex was subjected to salting-out, and then the precipitated copolymer was washed and dried to obtain 365 g of a white TFE/P/vinyl crotonate copolymer.

In the infrared spectrum of the copolymer, an absorption based on a carbon-carbon double bond in the vicinity of 1,700 cm$^{-1}$ was confirmed. The composition of the copolymer was such that repeating units based on TFE/repeating units based on P/repeating units based on vinyl crotonate=55.1/44.9/0.19 (molar ratio). The Mooney viscosity was 54. Crosslinked rubber properties of the TFE/P/vinyl crotonate copolymer are shown in Table 1.

Example 6

TFE/P/Vinyl Crotonate Copolymer Which Used Propane as Chain Transfer Agent

After deaerating a pressure-resistant reactor made of stainless steel having an internal volume of 3,200 mL, equipped with a stirring anchor blade, 1,600 g of deionized water, 40 g of disodium hydrogenphosphate dodecahydrate, 0.5 g of sodium hydroxide, 97 g of tert-butanol, 9 g of sodium lauryl sulfate and 2.5 g of ammonium persulfate were charged. Further, an aqueous solution having 0.4 g of EDTA and 0.3 g of ferrous sulfate heptahydrate preliminarily dissolved in 200 g of deionized water, was introduced. Then, at 40° C., a mixed monomer gas of TFE/P/propane=85/12/3 (molar ratio) was fed so as to bring the internal pressure of the reactor to be 2.60 MPaG. The anchor blade was stirred at 300 rpm, and a 4.6 mass % Rongalit aqueous solution was added to initiate the polymerization reaction. Thereafter, the 4.6 mass % Rongalit aqueous solution was continuously added by using a high-pressure pump.

As the polymerization proceeded, the pressure decreased. Accordingly, when the internal pressure of the reactor decreased to 2.59 MPaG, a mixed gas of TFE/P=56/44 (molar ratio) was fed by its own pressure to increase the internal pressure of the reactor to 2.61 MPaG. The polymerization reaction was continued by repeating this operation to maintain the internal pressure of the reactor to from 2.59 to 2.61 MPaG. When the amount of the TFE/P mixed gas added reached 10 g, 1 mL of a vinyl crotonate/tert-butanol=4/96 (mass ratio) solution preliminarily prepared was fed into the reactor by nitrogen backpressure. Thereafter, until the amount of the TFE/P mixed gas added reached 390 g, every time when 10 g of the TFE/P mixed gas was added, 1 mL of the tert-butanol solution of vinyl crotonate was added, and 39 mL was fed in total. When the total amount of the TFE/P mixed gas added reached 400 g, the addition of the 4.6 mass % Rongalit aqueous solution was stopped, and the internal temperature of the reactor was lowered to 10° C. to terminate the polymerization reaction to obtain a TFE/P/vinyl crotonate copolymer latex. The amount of the 4.6 mass % Rongalit aqueous solution used was 26 g. The polymerization time was about 4 hours.

In the same manner as in Example 1, the latex was subjected to salting-out, and then the precipitated copolymer was washed and dried to obtain 390 g of a white TFE/P/vinyl crotonate copolymer.

In the infrared spectrum of the copolymer, an absorption based on a carbon-carbon double bond in the vicinity of 1,700 cm$^{-1}$ was confirmed. The composition of the copolymer was such that repeating units based on TFE/repeating units based on P/repeating units based on vinyl crotonate=55.1/44.9/0.19 (molar ratio). The Mooney viscosity was 80. Crosslinked rubber properties of the TFE/P/vinyl crotonate copolymer are shown in Table 1.

Example 7

TFE/P/Vinyl Pivalate Copolymer

A TFE/P/vinyl pivalate copolymer latex was obtained in the same manner as in Example 1 except that a vinyl pivalate/tert-butanol=4.6/93.7 (mass ratio) solution was used instead of the vinyl crotonate/tert-butanol=5/95 (mass ratio) solution. The amount of the 4.6 mass % Rongalit aqueous solution used was 17 g. The polymerization time was about 3.5 hours.

In the same manner as in Example 1, the latex was subjected to salting-out, and then the precipitated copolymer was washed and dried to obtain 392 g of a white TFE/P/vinyl pivalate copolymer. In the infrared spectrum of the copolymer, an absorption based on a carbon-carbon double bond in the vicinity of 1,700 cm$^{-1}$ was confirmed. The composition of the copolymer was such that repeating units based on TFE/repeating units based on P/repeating units based on vinyl pivalate=56.1/43.9/0.18 (molar ratio). The Mooney viscosity was 99. Crosslinked rubber properties of the TFE/P/vinyl pivalate copolymer are shown in Table 1.

TABLE 1

|  | Example 1 | Example 2 | Comparative Example 1 | Example 3 | Example 4 | Example 5 | Example 6 | Example 7 |
|---|---|---|---|---|---|---|---|---|
| Tensile strength (MPa) | 18.0 | 17.9 | 5.3 | 15.5 | 15.0 | 18.0 | 18.0 | 9.0 |
| Elongation (%) | 212 | 220 | 240 | 225 | 235 | 260 | 250 | 500 |
| Hardness | 72 | 74 | 40 | 72 | 73 | 70 | 73 | 75 |

The TFE/P/vinyl crotonate copolymers obtained in Examples 1 to 6, which were obtained by copolymerizing vinyl crotonate as a vinyl ester monomer, were excellent in the crosslinkability and exhibited excellent crosslinked rubber properties. On the other hand, the TFE/P copolymer containing no repeating units based on a vinyl ester monomer in Comparative Example 1, had low tensile strength and hardness, and therefore, exhibited insufficient crosslinked rubber properties and the crosslinkability. With the TFE/P/vinyl pivalate copolymer (Example 7) obtained by copolymerizing vinyl pivalate as a vinyl ester monomer, a crosslinked rubber excellent in elongation was obtained.

Examples 8 to 13

By using the elastic fluorocopolymer produced in Example 1, in accordance with the components and its amounts as shown in Tables 2 and 4, those various components were uniformly mixed by means of twin rollers to prepare elastic fluorocopolymer compositions. The crosslinking properties of these elastic fluorocopolymer compositions thus obtained were measured at an angle of 3° at 177° C. for 12 minutes by means of a rubber process analyzer (RPA manufactured by ALPHA TECHNOLOGIES). Further, these fluorocopolymer compositions were subjected to press-crosslinking at 170° C. for 20 minutes, and then subjected to secondary crosslinking in an oven at 200° C. for 4 hours.

With respect to the crosslinking properties, MH indicates the maximum torque, ML indicates the minimum torque, MH-ML indicates the degree of crosslinking (also may be referred to as degree of vulcanization), t10 indicates an approximate value of scorch time and t90 indicates an approximate value of the optimum crosslinking time.

Comparative Examples 2 to 6

In the same manner as in Example 8, elastic fluorocopolymer compositions were produced, and their crosslinking properties were measured by means of the rubber process analyzer. Further, in Comparative Examples 2, 5 and 6, the secondary crosslinking was carried out in an oven at 230° C. for 24 hours. In Comparative Examples 3 and 4, the secondary crosslinking was carried out in the same manner as in Example 8.

In accordance with JIS K6351 and JIS K6253, the fundamental properties, heat resistance, chemical resistance and steam resistance of the crosslinked products obtained in Examples and Comparative Examples were measured. The results are shown in Tables 2, 3 and 4.

Further, "unable to mold" means that a test crosslinking rubber sheet for measuring physical properties of the crosslinked rubber was not obtained due to insufficient crosslinking.

Additionally, the names of the components shown in Tables 2 and 4 are as follows:

Polymer 1: the TFE/P/vinyl crotonate copolymer obtained in Example 1, TAIC: triallyl isocyanurate (Nippon Kasei Chemical Co., Ltd.), Kyowa Mag #150: magnesium oxide (Kyowa Chemical Industry Co., Ltd.), Calvit: calcium hydroxide (Ohmi Kagaku Kogyo K.K.), Perkadox 14: α, α'-bis(t-butylperoxy)-diisopropylbenzene (Kayaku Akzo K.K.), MT carbon: carbon black, TFE/P copolymer: TFE/P=56/44 (molar ratio) by composition, Nipsil-LP: synthetic amorphous silica/pH 5.5 to 6.5 (TOSOH SILICA CORPORATION), AFLAS MZ: TFE/P/VdF copolymer (polyol crosslinking agent contained) (ASAHI GLASS COMPANY, LIMITED), and Fluororubber G751: HFP/VdF copolymer (Daikin Industries, Ltd.).

TABLE 2

| | | Example 8 | Example 9 | Example 10 | Example 11 |
|---|---|---|---|---|---|
| Components (parts) | | | | | |
| (A) | Polymer 1 | 100 | 100 | 100 | 100 |
| (B) | TAIC | 5 | 5 | 5 | 5 |
| (C) | Kyowa Mag #150 | 0.3 | 1 | 3 | — |
| | Calvit | — | — | — | 1 |
| (D) | Perkadox 14 | 1 | 1 | 1 | 1 |
| Filler | MT carbon | 25 | 25 | 25 | 25 |
| Fluoro-rubber | TFE/P copolymer | — | — | — | — |
| Crosslinking properties RPA 177° C. × 12 min | | | | | |
| MH (dNm) | | 73 | 83 | 124 | 87 |
| ML (dNm) | | 35 | 34 | 33 | 32 |
| MH − ML (dNm) | | 38 | 49 | 91 | 55 |
| t10 (min) | | 0.6 | 0.6 | 0.6 | 0.4 |
| t90 (min) | | 1.6 | 2.0 | 2.2 | 2.0 |
| Fundamental properties | | | | | |
| Tensile strength (MPa) | | 16 | 16 | 17 | 16 |
| M100 (MPa) | | 7 | 8 | 9 | 8 |
| Elongation (%) | | 180 | 180 | 170 | 180 |
| Hardness (Shore-A) | | 72 | 73 | 73 | 72 |
| Specific gravity (−) | | 1.60 | 1.60 | 1.60 | 1.60 |

| | | Comp. Ex. 2 | Comp. Ex. 3 | Comp. Ex. 4 |
|---|---|---|---|---|
| Components (parts) | | | | |
| (A) | Polymer 1 | 100 | — | — |
| (B) | TAIC | 5 | 5 | 5 |
| (C) | Kyowa Mag #150 | — | — | 1 |
| | Calvit | — | — | — |
| (D) | Perkadox 14 | 1 | 1 | 1 |
| Filler | MT carbon | 25 | 25 | 25 |
| Fluoro-rubber | TFE/P copolymer | — | 100 | 100 |
| Crosslinking properties RPA 177° C. × 12 min | | | | |
| MH (dNm) | | 34 | 41 | 42 |
| ML (dNm) | | 15 | 6 | 7 |
| MH − ML (dNm) | | 19 | 35 | 35 |
| t10 (min) | | 1.1 | 0.8 | 0.9 |
| t90 (min) | | 9.6 | 6.5 | 6.6 |
| Fundamental properties | | | | |
| Tensile strength (MPa) | | Unable to mold | 15 | 15 |
| M100 (MPa) | | | 5 | 5 |
| Elongation (%) | | | 280 | 270 |
| Hardness (Shore-A) | | | 71 | 70 |
| Specific gravity (−) | | | 1.59 | 1.59 |

TABLE 3

| | Example 9 | Comparative Example 3 |
|---|---|---|
| Heat aging resistance 200° C. × 168 hours | | |
| Rate of change in tensile strength (%) | +4 | −1 |
| Rate of change in elongation (%) | −2 | +4 |

TABLE 3-continued

|  | Example 9 | Comparative Example 3 |
|---|---|---|
| Hardness change (point) | +1 | −1 |
| Chemical resistance | | |
| 20 mass % hydrochloric acid | | |
| (70° C. × 70 hours) | | |
| Rate of change in tensile strength (%) | −13 | −32 |
| Rate of change in elongation (%) | −6 | −13 |
| Hardness change (point) | ±0 | −5 |
| 20 mass % nitric acid | | |
| (70° C. × 70 hours) | | |
| Rate of change in tensile strength (%) | −18 | −50 |
| Rate of change in elongation (%) | −10 | −11 |
| Hardness change (point) | ±0 | −13 |
| 50 mass % sodium hydroxide | | |
| solution (70° C. × 70 hours) | | |
| Rate of change in tensile strength (%) | −3 | +1 |
| Rate of change in elongation (%) | −3 | +6 |
| Hardness change (point) | ±0 | −1 |
| 28 mass % ammonia water | | |
| (70° C. × 70 hours) | | |
| Rate of change in tensile strength (%) | −14 | −17 |
| Rate of change in elongation (%) | −6 | +15 |
| Hardness change (point) | +1 | −1 |
| Steam resistance | | |
| (160° C. × 168 hours) | | |
| Rate of change in tensile strength (%) | −4 | −3 |
| Rate of change in elongation (%) | −5 | +1 |
| Hardness change (point) | +1 | −1 |

TABLE 4

| | | Example 12 | Example 13 | Comp. Ex. 5 | Comp. Ex. 6 |
|---|---|---|---|---|---|
| Components (parts) | | | | | |
| (A) | Polymer 1 | 100 | 100 | — | — |
| (B) | TAIC | 5 | 5 | — | — |
| (C) | Kyowa Mag #150 | 1 | 1 | 3 | 3 |
| | Calvit | — | — | 3 | 3 |
| (D) | Perkadox 14 | 1 | 1 | — | — |
| Filler | Nipsil-LP | 30 | — | 30 | — |
| | MT carbon | — | 25 | — | 30 |
| Fluoro-rubber | AFLAS MZ | — | — | 100 | 100 |
| | Fluoro-rubber G751 | — | 1 | — | 1 |
| Crosslinking properties RPA 177° C. × 12 min | | | | | |
| MH (dNm) | | 132 | 86 | 34 | 14 |
| ML (dNm) | | 77 | 34 | 24 | 6 |
| MH − ML (dNm) | | 55 | 52 | 10 | 8 |
| t10 (min) | | 0.3 | 0.6 | 0.1 | 0.8 |
| t90 (min) | | 1.2 | 2.5 | 0.1 | 4.1 |
| Fundamental properties | | | | | |
| Tensile strength (MPa) | | 18 | 16 | Unable to mold | Unable to mold |
| M100 (MPa) | | 16 | 8 | | |
| Elongation (%) | | 120 | 170 | | |
| Hardness (Shore-A) | | 94 | 72 | | |
| Specific gravity (−) | | 1.63 | 1.61 | | |

As shown in Table 2, the elastic fluorocopolymer compositions in Examples 8 to 11 were excellent in the crosslinkability such as a high MH and ML, a short time in t10 and t90, and a high crosslinking speed, and exhibited excellent crosslinked rubber properties, as compared with the elastic fluorocopolymer compositions in Comparative Examples 2 and 3, which contain no bivalent metal oxide nor hydroxide, or as compared with the fluororubber compositions in Comparative Examples 3 and 4, which contain another fluororubber instead of the elastic fluorocopolymer used in the present invention.

Further, as shown in Table 3, the elastic fluorocopolymer composition in Example 9 was excellent in the crosslinkability, and at the same time, the rates of change in tensile strength, the rates of change in elongation and hardness changes after impregnating it in 20 mass % hydrochloric acid, 20 mass % nitric acid, a 50 mass % sodium hydroxide solution and a 28 mass % ammonia water at 70° C. for 70 hours were small as compared with the fluororubber composition in Comparative Example 3, which does not contain the elastic fluorocopolymer used in the present invention and a bivalent metal oxide. The composition exhibited excellent crosslinked rubber properties such as very excellent chemical resistance and particularly, the rates of change in tensile strength after impregnating the elastic fluorocopolymer composition in Example 9 in 20 mass % hydrochloric acid and 20 mass % nitric acid at 70° C. for 70 hours were about ⅓ as compared with Comparative Example 3.

Even though the elastic fluorocopolymer composition in Example 12 contains silica, it had an excellent crosslinkability such as a high MH and ML and a high crosslinking speed, without inhibiting the crosslinking reaction, and exhibited excellent crosslinked rubber properties, as compared with the elastic fluorocopolymer composition in Comparative Example 5.

As shown in Table 4, even though the elastic fluorocopolymer composition in Example 13 contains the HFP/VdF copolymer, it had an excellent crosslinkability such as a high MH and ML, a short time in t10 and t90 and a high crosslinking speed, without inhibiting the crosslinking reaction, and exhibited excellent crosslinked rubber properties, as compared with the elastic fluorocopolymer composition in Comparative Example 6.

INDUSTRIAL APPLICABILITY

The present invention can economically and readily provide a crosslinkable elastic fluorocopolymer, an elastic fluorocopolymer composition and a crosslinked rubber obtained by crosslinking it, and its industrial use is extremely profitable. Further, the crosslinked rubber of the present invention may be applied to O-rings, unusually cross-sectional shaped rings such as X-shaped or V-shaped rings, sheets, gaskets, oil seals, dampers, diaphragms, hoses, tubes, etc., on the basis of its excellent physical properties. Further, the crosslinked rubber of the present invention is very useful for a wide range of applications including a heat resistant/chemical resistant sealing material, a wire-covering material, a sealing material for semiconductor devices or for equipments for manufacturing a liquid crystal, a sealing material for urea-resistant greases, a material for conveyor, a cushion material, a material for corrosion-resistant rubber coatings, parts for e.g. food plants, chemical plants, etc.

The entire disclosures of Japanese Patent Application No. 2004-228191 filed on Aug. 4, 2004, Japanese Patent Application No. 2005-90143 filed on Mar. 25, 2005, Japanese Patent Application No. 2005-167065 filed on Jun. 7, 2005 and Japanese Patent Application No. 2005-185035 filed on Jun. 24, 2005, including specifications, claims, drawings and summaries are incorporated herein by reference in their entireties.

What is claimed is:

1. An elastic fluorocopolymer comprising repeating units (l) based on at least one fluoromonomer selected from the group consisting of tetrafluoroethylene, hexafluoropropylene, vinylidene fluoride and a perfluorovinyl ether represented by the formula $CF_2=CF-O-R^f$ (wherein $R^f$ is a $C_{1-8}$ saturated perfluoroalkyl group or a perfluoro(alkoxyalkyl) group), repeating units (m) based on vinyl crotonate, and optionally, repeating units (n) based on at least one hydrocarbon monomer selected from the group consisting of ethylene, propylene and a vinyl ether represented by the formula $CH_2=CH-O-R^4$ (wherein $R^4$ is a $C_{1-8}$ saturated alkyl group or an alkoxyalkyl group) in a molar ratio of $(m)/((l)+(n))=0.0001$ to $0.1$.

2. The elastic fluorocopolymer according to claim 1, which comprises the repeating units (n) in a molar ratio of $(n)/(l)=1/99$ to $70/30$.

3. The elastic fluorocopolymer according to claim 1, wherein the fluoromonomer is tetrafluoroethylene, the hydrocarbon monomer is propylene, $(n)/(l)=40/60$ to $60/40$ (molar ratio), and $(m)/((l)+(n))=0.0001$ to $0.05$ (molar ratio).

4. The elastic fluorocopolymer according to claim 1, wherein $(m)/((l)+(n))=0.001$ to $0.008$ (molar ratio).

5. The elastic fluorocopolymer according to claim 1, wherein repeating units (l) are based on at least tetrafluoroethylene.

6. The elastic fluorocopolymer according to claim 1, wherein repeating units (l) are based on at least hexafluoropropylene.

7. The elastic fluorocopolymer according to claim 1, wherein repeating units (l) are based on at least vinylidene fluoride.

8. The elastic fluorocopolymer according to claim 1, wherein repeating units (l) are based on at least the perfluorovinyl ether.

9. The elastic fluorocopolymer according to claim 1, which has a Mooney viscosity of from 20 to 150.

10. The elastic fluorocopolymer according to claim 1, which has a Mooney viscosity of from 30 to 150.

11. A process for producing the elastic fluorocopolymer as defined in claim 1, which comprises subjecting the fluoromonomer, the vinyl crotonate, and optionally, the hydrocarbon monomer, to radical copolymerization in the presence of a radical polymerization initiator.

12. The process for producing the elastic fluorocopolymer according to claim 11, wherein the radical copolymerization is emulsion polymerization carried out in the presence of an aqueous medium and an emulsifier.

13. The process for producing the elastic fluorocopolymer according to claim 11, wherein the radical copolymerization is polymerization carried out in the presence of a chain transfer agent, and the chain transfer agent is an alcohol and/or a hydrocarbon.

* * * * *